United States Patent [19]

Wood et al.

[11] Patent Number: 5,313,292

[45] Date of Patent: * May 17, 1994

[54] WINDSHIELD DISPLAY SYSTEM FOR AN AUTOMOBILE

[75] Inventors: Robert B. Wood, Hillsboro; Mark A. Thomas, Beaverton, both of Oreg.; James L. Valimont, Cheswick, Pa.; H. Edward Littell, Jr., Gibsonia, Pa.; Glenn E. Freeman, Tarentum, Pa.

[73] Assignee: Flight Dynamics, Portland, Oreg.

[*] Notice: The portion of the term of this patent subsequent to Jun. 27, 2006 has been disclaimed.

[21] Appl. No.: 364,022

[22] Filed: Jun. 9, 1989

Related U.S. Application Data

[63] Continuation-in-part of Ser. No. 62,447, Jun. 12, 1987, Pat. No. 4,842,389.

[30] Foreign Application Priority Data

Jun. 13, 1988 [CA] Canada .................... 569315

[51] Int. Cl.$^5$ ............................ G02B 5/32; G03H 1/04
[52] U.S. Cl. ......................... 359/13; 359/14; 359/15; 430/1; 430/2
[58] Field of Search ................... 359/13, 14, 630, 631, 359/632, 633, 3, 15; 430/1, 2

[56] References Cited

U.S. PATENT DOCUMENTS

| Re. 21,904 | 9/1941 | Land . | |
|---|---|---|---|
| 1,871,877 | 8/1932 | Buckman . | |
| 2,264,044 | 11/1941 | Lee . | |
| 2,641,159 | 6/1953 | Mihalakis . | |
| 2,750,833 | 6/1956 | Gross . | |
| 3,276,813 | 10/1966 | Shaw . | |
| 3,446,916 | 5/1969 | Abel et al. . | |
| 3,523,847 | 8/1970 | Edwards | 156/99 |
| 3,848,974 | 11/1974 | Hosking et al. | 350/174 |
| 3,887,273 | 6/1975 | Griffiths | 353/14 |
| 3,899,241 | 8/1975 | Malobicky, Jr. et al. | 350/174 |
| 3,915,548 | 10/1975 | Opittek et al. . | |
| 3,940,204 | 2/1976 | Withrington . | |
| 4,218,111 | 8/1980 | Withrington et al. | 350/3.72 |
| 4,261,635 | 4/1981 | Freeman | 350/3.72 |
| 4,261,647 | 4/1981 | Ellis | 359/630 |
| 4,356,052 | 10/1982 | Moraw et al. | 156/498 |
| 4,398,799 | 8/1983 | Swift | 350/174 |
| 4,530,564 | 7/1985 | Close | 350/3.69 |
| 4,582,389 | 4/1986 | Wood et al. | 350/3.69 |
| 4,600,271 | 7/1986 | Boyer et al. | 359/630 |
| 4,613,200 | 9/1986 | Hartman | 350/3.7 |
| 4,669,810 | 6/1987 | Wood | 350/3.7 |
| 4,688,879 | 8/1987 | Fairchild | 350/3.7 |
| 4,711,544 | 12/1987 | Iino et al. | 353/14 |
| 4,729,634 | 3/1988 | Raber | 350/174 |
| 4,740,780 | 4/1988 | Brown et al. | 340/705 |
| 4,789,211 | 12/1988 | Wreede | 359/3 |
| 4,842,389 | 6/1989 | Wood et al. | 350/174 |
| 4,854,674 | 8/1989 | Wreede | 359/3 |
| 4,950,567 | 8/1990 | Keys et al. | 359/13 |

FOREIGN PATENT DOCUMENTS

| 0066496 | 12/1982 | European Pat. Off. | 359/13 |
|---|---|---|---|
| 0104114 | 3/1984 | European Pat. Off. | 359/13 |
| 0216692 | 4/1987 | European Pat. Off. | G02B 5/32 |
| 2242316 | 2/1974 | Fed. Rep. of Germany | B60K 35/00 |
| 2115178 | 9/1983 | United Kingdom | G03B 21/60 |

OTHER PUBLICATIONS

Brown, David A. "Simulator Aids Aircraft Design", *Aviation Week & Space Technology*, Feb. 7, 1972, 38–41.
Stein, Kenneth J. "Cat. 2 Jet Tests Head–Up Display", *Aviation Week & Space Technology*, Mar. 6, 1972, 53–55.
Kenji Horikiri and Fumio Ueda "A Head–Up Display for Automotive Use" Proceedings of the SID, vol. 28/3 1987, pp. 287–290.

*Primary Examiner*—Martin Lerner
*Attorney, Agent, or Firm*—Stoel Rives Boley Jones & Grey

[57] ABSTRACT

A windshield display system for automobile includes a wavelength selective holographic combiner (12) laminated within the plies (36, 50) of an automobile windshield. A lamination process is provided to prevent degradation of the holographic combiner (12), which might otherwise occur with conventional windshield lamination processes. The holographic combiner (12) is processed in a manner that permits it to withstand the temperature and pressure extremes of the windshield lamination process. Also provided is a display system (60) for producing an image of vehicle information and the motorist's field of view as the motorist observes the real world scene.

14 Claims, 3 Drawing Sheets

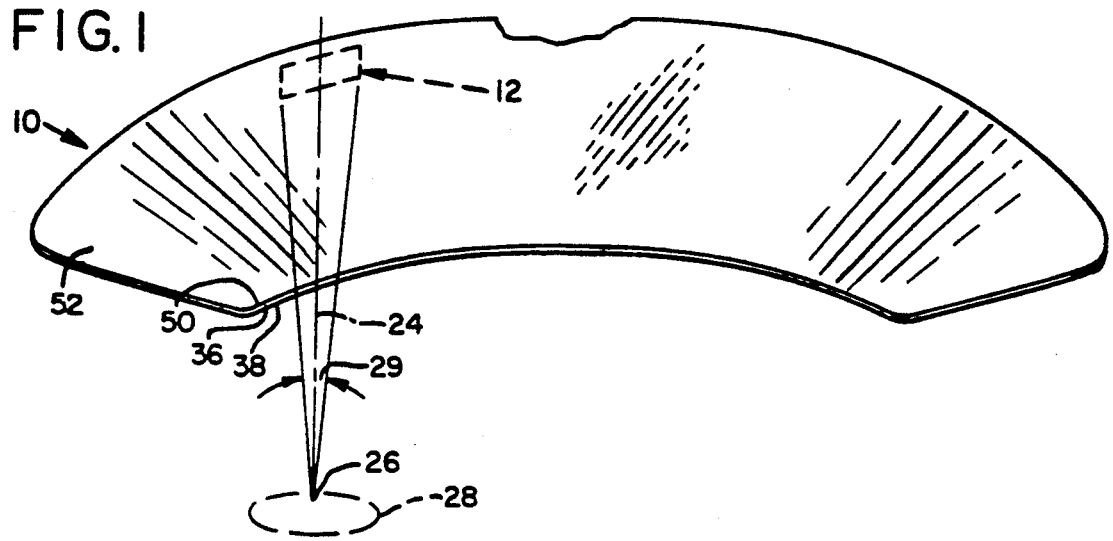
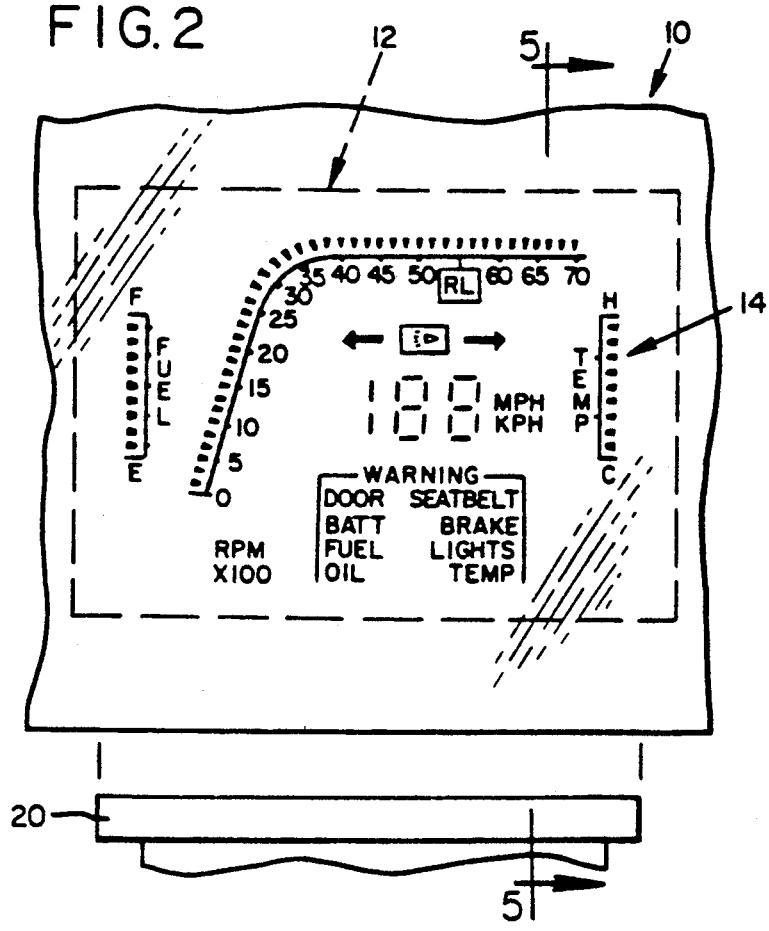
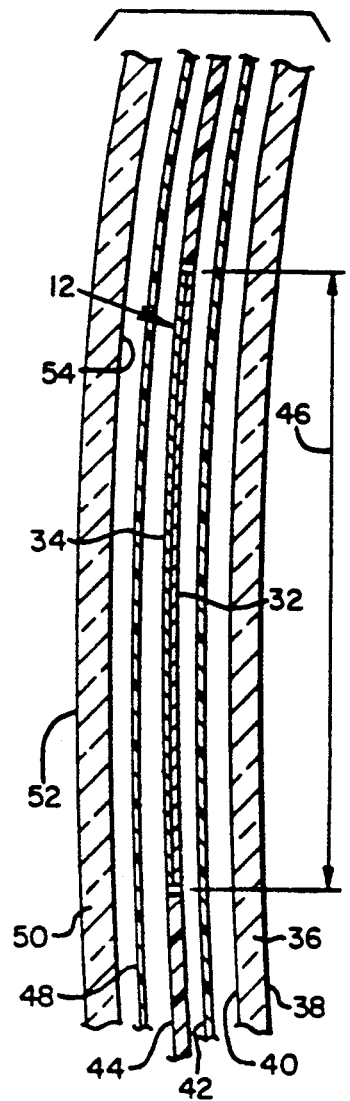

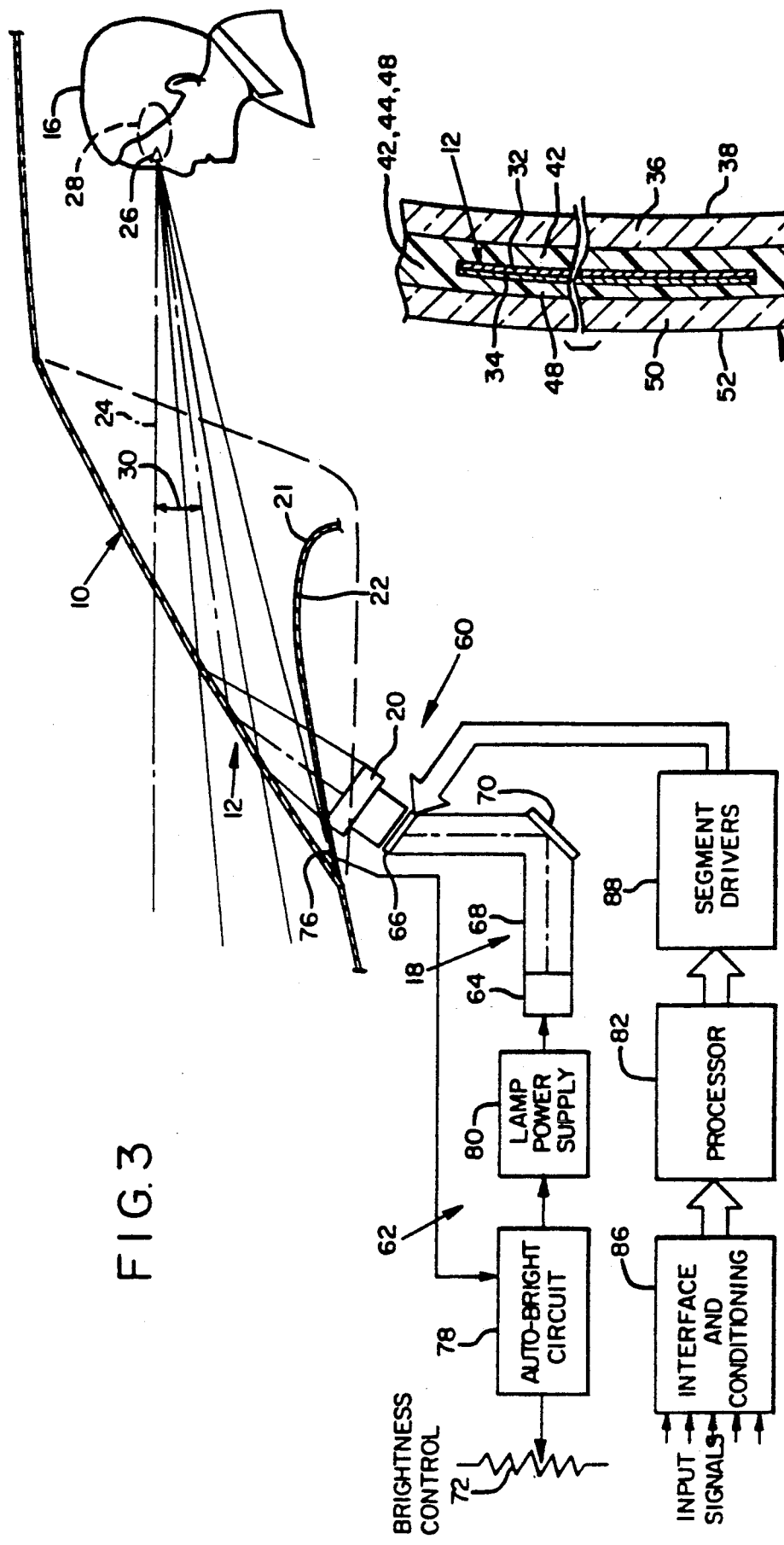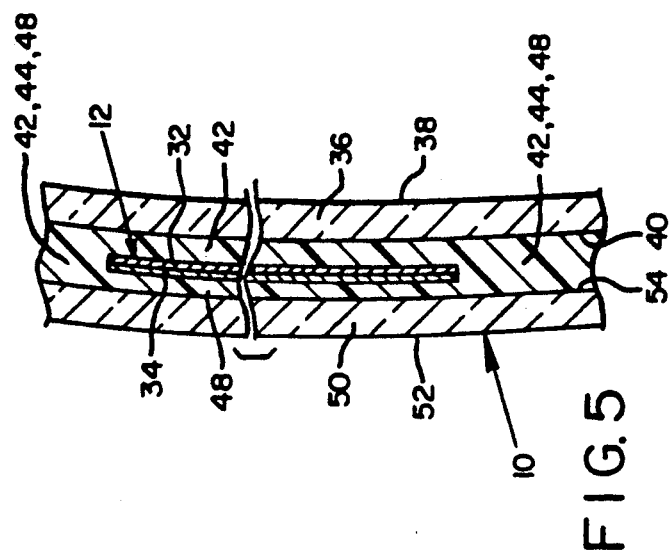
FIG. 3
FIG. 5

WINDSHIELD DISPLAY SYSTEM FOR AN AUTOMOBILE

This is a continuation-in-part of U.S. patent application Ser. No. 07/062,447, filed Jun. 12, 1987, now U.S. Pat. No. 4,842,389 issued Jun. 27, 1989.

TECHNICAL FIELD

This invention pertains to display systems for motor vehicles and, in particular, to an automobile windshield display system that includes holographic optical elements.

BACKGROUND ART

A head-up display system is used to display information to an observer while permitting the observer to simultaneously view the real world scene. In the past, head-up display systems have been incorporated into aircraft cockpits for displaying important flight information to a pilot. Head-up displays eliminate the need for the pilot to glance downwardly to view the information on an instrument panel.

An important component of a head-up display system is known as the combiner. The combiner is positioned forward of the observer and extends partly across the observer's view of the real world scene. The combiner is constructed to transmit light coming from the real world scene and to reflect light information of a particular wavelength propagating from a luminous source. The light information is projected onto the combiner by way of suitable optical elements. The information-carrying light rays reflected by the combiner are typically collimated to present an image of the information at optical infinity. Accordingly, the observer can simultaneously view the real world scene and the displayed information without changing eye focus. The combiner may be shaped to provide the collimation, or a separate collimating optical element may be employed.

It is known that a particularly effective combiner can be constructed using a hologram or a holographic optical element. Several U S. patents disclose holographic head-up display systems. See, for example, U.S. Pat. No. 4,582,389 entitled "Holographic Device," U.S Pat. No. 4,613,200 entitled "Heads Up Display System with Holographic Dispersion Correcting," or U.S. Pat. No. 3,940,204 entitled "Optical Display Systems Utilizing Holographic Lenses."

Combiners used in prior art holographic head-up display systems most often comprise a hologram recorded in dichromated gelatin and mounted to a planar or nonplanar substrate of either transparent glass or plastic. The combiner is held with suitable support mechanisms within the observer's line of sight. When it is employed in an aircraft cockpit, the combiner is mounted between the observer and the aircraft windshield.

In a motor vehicle, the motorist views the forward outside real world scene through the windshield. Information pertaining to the operational status of the vehicle is typically displayed on an instrument panel located beneath the windshield and out of the motorist's view of the real world scene. It can be appreciated that a head-up display system providing important vehicle information, such as, for example, fuel supply and vehicle speed, positioned within the motorist's field of view through the windshield would permit the motorist to safely maintain eye contact with the real world scene while simultaneously viewing the display information.

DISCLOSURE OF THE INVENTION

The present invention is directed to a windshield display system having a combiner, which includes a wavelength selective element, such as a hologram, incorporated within the windshield of a motor vehicle. The windshield components, including the holographic combiner, are laminated into a unitary article by a method that prevents degradation of the holographic combiner, which might otherwise occur with conventional windshield lamination processes.

The holographic combiner formed in accordance with this invention cooperates with the elements of an optical display system to produce an image of vehicle information in the motorist's field of view as the motorist observes the real world scene. Forming the windshield with the holographic combiner inside provides a clutter-free space between the motorist's eyes and the windshield because there is no need for separate mechanisms external to the windshield for mounting the combiner in front of the observer. The combiner is sealed within the windshield to protect against abrasion and deterioration that would otherwise result from exposure.

As another aspect of the invention, the hologram is processed in a manner that permits it to withstand the temperature and pressure extremes of the windshield lamination process.

As yet another aspect of this invention, there is provided an automobile windshield display system comprising a holographic combiner mounted to a single glass ply.

BRIEF DESCRIPTION OF THE DRAWINGS

FIG. 1 is a top view of a holographic windshield display system formed in accordance with the present invention.

FIG. 2 is an enlarged front elevation view of exemplary symbology as would be displayed to an observer viewing the holographic combiner mounted to the windshield of FIG. 1.

FIG. 3 is a diagram of an optical display system installed in a motor vehicle for use with the holographic combiner of FIG. 1.

FIG. 4 is an exploded cross sectional view of the plies and interlayers used to form the windshield of FIG. 1 by means of a lamination process.

FIG. 5 is an enlarged sectional view of the windshield taken along line 5—5 of FIG. 2.

BEST MODES FOR CARRYING OUT THE INVENTION

Figure 6:
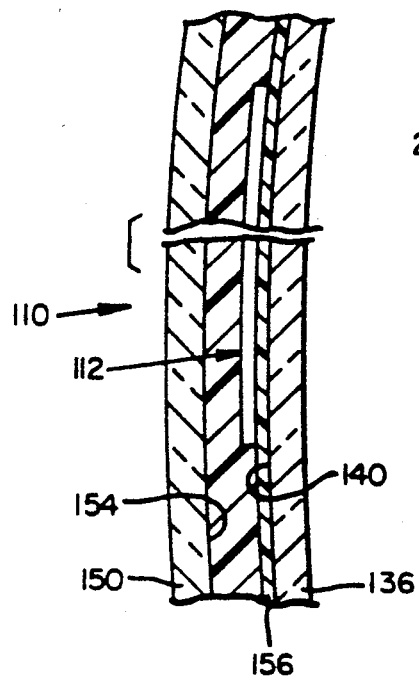
FIG. 6 is an enlarged sectional view of an alternative embodiment of a windshield formed in accordance with this invention, illustrating an alternative arrangement of the windshield components.

With reference to FIGS. 1-3, the windshield display system of the present invention comprises a motor vehicle windshield 10 that incorporates a combiner element 12 for reflecting information-carrying light rays in the form of symbology 14 into the field of view of a motorist 16. Combiner 12 includes a wavelength selective element, preferably of the holographic type. The light rays emanate from an image source 18 and are projected onto the holographic combiner 12. The holographic combiner is manufactured to reflect wavelengths of light included within a predetermined narrow bandwidth. The predetermined bandwidth includes the wavelength corresponding to the wavelength and angle of incidence of the source light that is projected onto combiner 12. The holographic combiner 12 is held within the laminae of the windshield 10 as described more fully below.

A suitable projection and aberration correction optical assembly 20 is preferably mounted immediately beneath the upper surface 21 of the vehicle dashboard 22 and is positioned between the image source 18 and the holographic combiner 12 to project the light onto the combiner 12 so that the resulting image viewed by the motorist is focused at a distance preferably of between about three and fifteen meters forward of the vehicle windshield 10. The optical assembly 20 also compensates for spherical aberrations and optical aberrations introduced by the curvature of windshield 10. It will be appreciated that an overhead mounting of an image source 18 and optical assembly 20 may be advantageously employed in certain vehicles, such as, for example, large trucks.

The image source 18 preferably includes a transmissive liquid crystal display (LCD) that is illuminated to project symbology-carrying light rays through the optical assembly 20 to the combiner 12. FIG. 2 shows exemplary projected symbology 14 in the form of numerical or graphical symbols representing vehicle speed, fuel level, engine RPM, temperature, and warning messages.

The holographic combiner 12 is arranged to display symbology 14 within a particular region relative to the motorist's direct line of sight. Specifically, line 24 in FIGS. 1 and 3 represents the motorist's direct line of sight as the motorist views the outside real world scene substantially straight ahead. Line of sight 24 extends through eye reference point 26 within an eye ellipse indicated by dashed outline 28. The eye reference point 26 is a geometrical point in space representing the horizontal center of the eye ellipse 28 and is the midpoint between the motorist's eyes.

The combiner 12 is preferably positioned so that the displayed symbology 14 is located within an angle 29 of approximately 12° centered about the motorist's direct line of sight as measured in the plane of FIG. 1. Preferably, the combiner 12 is located in the lower portion of the windshield 10 so that the center of the displayed information is located at an angle 30 of approximately 10° beneath the motorist's direct line of sight 24 as measured in the plane of FIG. 3. The preferred location of the combiner 12 provides an information display region that permits peripheral viewing of the outside real world scene as the motorist monitors the display. It is contemplated that alternative locations will also provide an effective windshield display system for a vehicle.

The holographic combiner 12 is attached to the windshield 10 by a lamination process. It has been found that conventionally manufactured holograms require modified processing to withstand the windshield lamination process, which is described more fully below, and that the hologram is more easily manufactured in planar form and then bent during lamination to conform to the final contour of the windshield. With reference to FIG. 4, attention is now turned to the preferred method of fabricating holograms that are incorporated into a laminated windshield for use as a combiner. In this portion of the description the terms "holographic combiner" and "hologram" are both used, the term "holographic combiner" generally indicating the hologram after it is positioned within the windshield to function as a combiner in the windshield display system.

The hologram is formed by deposition of a layer 32 of holographic recording material of between about 10 and 40 microns in thickness onto an optically transparent substrate 34. The substrate 34 is secured in a planar orientation by a support mechanism, such as a conventional vacuum holder, as the layer 32 of holographic recording material is deposited onto substrate 34. A suitable holographic recording material would be a photosensitive emulsion, such as, for example, a V.S.P. grade gelatin available from J.T. Baker Chemical Company. The substrate 34 is flexible and preferably is a polyester or polycarbonate film of approximately 0.125 mm in thickness. If the selected substrate is hydrophobic, a suitable subbing agent is applied to the surface of the substrate upon which the layer 32 of gelatin is deposited. The subbing agent provides the surface with hydrophilic characteristics that provide effective bonding between the gelatin and the substrate.

After it is deposited on the substrate 34, the layer 32 of gelatin is sensitized in a solution of ammonium dichromate, as is known in the art. The gelatin is then exposed to light to create the hologram. Preferably, the hologram is exposed using the techniques described in U.S. Pat. No. 4,582,389 entitled "Holographic Device," which is herein incorporated by reference. The holographic fringe lines preferably are substantially parallel to the surface of substrate 34 such that there are fewer than 2 fringe line pairs per millimeter intersecting the surface of substrate 34. This provides a hologram with essentially zero optical power and no flare.

Once exposed, the hologram is processed in a conventional manner. One acceptable processing procedure comprises washing the hologram for fifteen minutes in running water having a temperature of between 16° and 20° C.; soaking the hologram in isopropanol for 2 minutes with continuous agitation; and drying the hologram in a vacuum oven for 2 hours at a temperature of at least 100° C.

After the initial processing of the hologram as just described, secondary processing of the hologram is undertaken to ensure that it will withstand the windshield lamination process. The secondary processing entails an optional step of applying a moisture barrier to the hologram, followed by heat stabilizing the hologram and storing it in a relatively low humidity environment.

In particular, the hologram is dipped into a solution of a highly volatile solvent and a solute that remains as an effective moisture barrier covering the hologram surface after the solvent is evaporated. The moisture barrier serves as a humidity stabilizing agent for the hologram during the lamination process. A preferred solution is a 2% by weight solution of a fluorocarbon powder based on a polychlorotrifluoroethylene resin (such as that manufactured by M. W. Kellogg Company under the trademark KEL-F) dissolved in liquid freon. After the hologram is dipped in the solution, the freon is evaporated leaving the KEL-F moisture barrier coating the hologram surface. Although a 2% solution is preferred, acceptable results can be obtained with a 0.5% to 5% solution. The above-described deposition of a moisture barrier would be unnecessary if the interlayers used in the lamination process are made of sufficiently dry material.

After the moisture barrier has been applied, the hologram is heat-stabilized by placing it in a vacuum oven and heating the hologram from room temperature to a peak temperature of between 120° C. and 140° C., with 135° C. being the preferred temperature. The hologram is heated to reach a peak temperature within 30 to 90 minutes, with 60 minutes being the preferred time to reach the peak temperature. The hologram is then slowly cooled for 60 to 120 minutes until it reaches room temperature, the hologram preferably reaching room temperature after 90 minutes.

Finally, the hologram is stored in a environment having a relative humidity of less than about 30% and a temperature of between about 20° C. and 30° C. until it is laminated into the windshield. After the secondary processing, the hologram is approximately 0.15 mm thick.

Turning now to the particular process for forming a holographic windshield in accordance with this invention, the windshield 10 comprises an inner glass ply 36 preformed into the curvature of the windshield by conventional means. The inner glass ply 36 is approximately 2.3 mm thick and has an outer surface 38 that faces the motorist after the windshield is installed in the vehicle. The inner glass ply 36 also has an inner surface 40 upon which a flexible transparent inner interlayer 42 is overlaid. The inner interlayer 42 is made of a thin, dry, flexible plastic material, such as a 0.38 mm sheet of polyurethane or plasticized polyvinyl butyral. A middle flexible, transparent interlayer 44, having a 0.15 mm thickness corresponding to the thickness of the hologram, is next overlaid upon the inner interlayer 42. The middle interlayer 44 is formed of a sheet of dried polyurethane or plasticized polyvinyl butyral. The middle interlayer 44 has an opening 46 formed in it. The opening 46 is sized and located to correspond to the preferred location and size of the holographic combiner 12 within the windshield 10, as was described above. The hologram 12 is fitted into the opening 46.

An outer flexible, transparent interlayer 48 is next overlaid upon the middle interlayer 44 with the hologram in place within opening 46. The outer interlayer 48 is formed of a dry, flexible plastic material, such as a 0.38 mm sheet of polyurethane or plasticized polyvinyl butyral. Each of the interlayers 42, 44, and 48 is handled or applied in a manner to avoid wrinkling or differential stretching.

An outer glass ply 50 having a 2.3 mm thickness is placed over the outer interlayer 48. Outer glass ply 50 has an outer surface 52 that is exposed to the outside environment of the vehicle and an inner surface 54 of preformed curvature that complements the curvature of inner surface 40 of inner glass ply 36. It will be appreciated that plies 36 and 50 could be made of a plastic or other suitable optically transparent material.

Excess plastic is cut away from the entire assembly of interlayers and glass plies described above. The assembly is then prepressed, for example, by passing it between a pair of prepressing rollers at a temperature of 65° C. to 107° C. Prepressing removes air from between the interfaces of the various interlayers and sheets and seals at least the peripheral edge of the assembly. One suitable prepressing device is depicted in U.S. Pat. No. 3,351,001 to Achkio.

The prepressed assembly is then laminated in an air autoclave for approximately 2 hours at a temperature of 120° to 160° C. and a simultaneously applied pressure of 12.3 to 15.8 Kg/cm$^2$.

The lamination process causes the interlayers 42, 44, and 48 to blend together and thereby form a cover for both surfaces of hologram 12, as shown in FIG. 5. Following lamination, the inner interlayer 42 and outer interlayer 48 are defined only along the surfaces of hologram 12, and the middle interlayer 44 is completely blended together with the material that formed interlayers 42 and 48.

The lamination process just described may be modified to avoid possible degradation of the dichromated gelatin hologram 12 and the resultant reduction in hologram diffraction efficiency. Such degradation may occur during the conventional lamination process if the hologram 12 is exposed to moist air, or is exposed to moisture that is released from interlayers 42, 48 as the windshield assembly is subjected to severe heating and cooling over a short time period in an environment that restricts transfer of moisture away from the hologram.

Prevention of this hologram degradation is best accomplished by a lamination process that includes gradual heating of the windshield assembly within a relatively dry environment. This process is hereinafter referred to as the "modified lamination process".

A preferred modified lamination process includes the preliminary step of insuring that all interlayers employed in constructing the holographic windshield have a low moisture content. This preliminary step may be accomplished by storing the interlayers, for at least 2 hours prior to lamination, in an environment having a relative humidity of less than about 30% and a temperature of between about 20° C. and 30° C.

After the components of the holographic windshield are assembled and, if necessary, prepressed, the assembly is laminated in an autoclave having a ramped heating cycle that permits efficient dissipation of any moisture released by the holographic windshield components during the lamination process. A suitable autoclave heating cycle comprises first raising the autoclave temperature from room temperature to an intermediate temperature level, for example, 60° C., within about 3 to 7 minutes, preferably 5 minutes. The autoclave is held at the intermediate temperature level for about 10 to 20 minutes, preferably 15 minutes. Next, the autoclave temperature is raised from the intermediate temperature level to a maximum temperature level, for example, 130° C., within about 5 to 15 minutes, preferably, 10 minutes. The autoclave is held at the maximum temperature level for about 70 to 110 minutes, preferably 90 minutes. The autoclave is then cooled to room temperature in about 5 to 15 minutes, preferably 10 minutes.

It is contemplated that no deleterious effects on the assembly will occur if the intermediate and maximum temperature levels of the modified lamination process vary by about 20° from those levels indicated above.

There are alternative acceptable arrangements of the components of a holographic windshield, some of which are described now.

FIG. 6 depicts an alternative embodiment of a windshield wherein a holographic combiner 112 is positioned between a transparent inner ply 136 and transparent outer ply 150, and adjacent to the inner surface 140 of the inner glass ply 136. (Alternatively, the holographic combiner 112 could be positioned adjacent to the inner surface 154 of the outer ply 150). The holographic combiner 112 is substantially the same as the holographic combiner 12 of FIG. 1. The inner ply 136 and outer ply 150 are glass, plastic or other suitable optically transparent material and are configured substantially the same as the inner ply 36 and outer ply 50 described earlier (see FIG. 4).

It is contemplated that the holographic combiner 112 may be positioned in direct contact with the inner surface 140 of the inner ply 136; however, it is preferred that a thin primer layer 156 be applied to the inner surface 140 of the inner ply 136 between that ply 136 and the holographic combiner 112. The thin primer layer 156 may comprise a sprayed coating of adhesive urethane material. The primer layer 156, the thickness of which is shown enlarged in the figure, serves to stablize the position of the holograpic combiner 112 relative to the inner ply 136.

With continued reference to FIG. 6, the side of the holographic combiner 112 that faces the outer ply 150 is covered with an interlayer 148 of flexible transparent plastic material, such as a 0.38 mm sheet of polyurethane or plasticized polyvinyl butyral.

The embodiment of the windshield 110 of FIG. 6 is formed into a unitary article in accordance with the modified lamination process described above.

To avoid the creation of voids between the edges of the holographic combiner 112 and the interlayer 148, it is desirable to produce the holographic combiner as thin as practicable. In this regard, it is contemplated that an opening in the interlayer 148 may be formed of a size to receive therein the holographic combiner 112.

Figure 7:
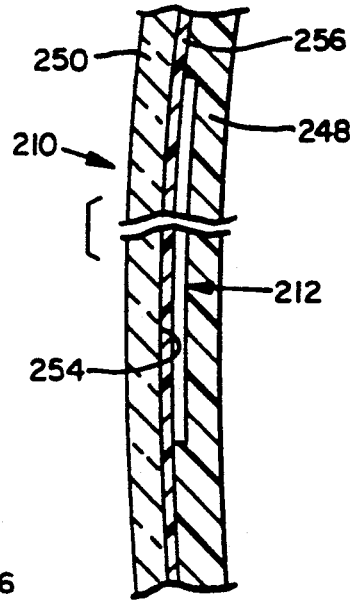
FIG. 7 is an enlarged sectional view of another alternative embodiment of a windshield formed in accordance with this invention, illustrating an alternative arrangement of the windshield components.

With reference to FIG. 7, there is illustrated another alternative embodiment of a holographic windshield 210 having a single glass ply 250. This embodiment includes a holographic combiner 212 positioned against the inner surface 254 of the transparent glass ply 250. Plastic or other suitable material may be used for the ply 250.

Preferably, a primer layer 256, which is substantially the same as the primer layer 156 described with reference to the embodiment of FIG. 6, is applied to the inner surface 254 of the ply 250 between that ply and the holographic combiner 212. The surface of the holographic combiner 212 facing away from the ply 250 is covered with an interlayer 248 of flexible transparent plastic material, such as a 0.38 mm sheet of polyurethane or plasticized polyvinyl butyral.

In the embodiment of FIG. 7, no second glass ply is incorporated into the windshield 210, and the windshield is laminated into a unitary article in accordance with the modified lamination process described above. Further, any problem with voids forming along the edges of the holographic combiner 212 may be eliminated in accordance with the techniques described above with respect to the embodiment of FIG. 6.

Figure 8:
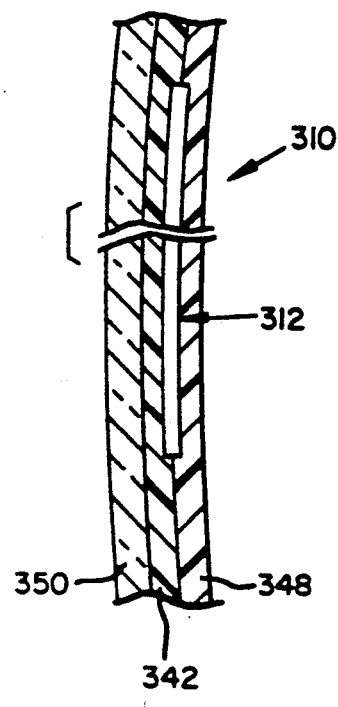
FIG. 8 is an enlarged sectional view of another alternative embodiment of a windshield formed in accordance with this invention, illustrating an alternative arrangement of the windshield components.

FIG. 8 illustrates an embodiment of a holographic windshield 310 wherein the holographic combiner 312 is sandwiched between an inner interlayer 342 and an outer interlayer 348. The inner interlayer 342, holographic combiner 312, and outer interlayer 348 are laminated to the inner surface 354 of a single glass ply 350. As noted above, the holographic combiner 312 should be manufactured to be as thin as practicable so that voids will not remain along the edges thereof after the lamination process.

It can be appreciated that during the lamination of the windshield components depicted in FIGS. 7 and 8, the elements that are employed for applying the pressure to the windshield components must be suitably treated to ensure that the exposed surfaces of the interlayers 248, 348 do not adhere to those elements.

FIG. 3 is a block diagram of an optical display system 60 that includes holographic combiner 12 in the windshield 10, which is installed in a motor vehicle. Optical display system 60 includes an optical and electronic processing subsystem 62 that is preferably positioned below the dashboard 22 of the vehicle and the windshield 10 that holds the holographic combiner element 12. Optical lens projection system 20 corrects for the compound curvatures of the windshield and projects display symbology for reflection off of the hologram 12, which is embedded within the windshield 10, toward the observer 16.

More specifically, processing subsystem 62 includes the image source 18 that comprises a light source 64 and a liquid crystal display 66. Light source 64 and liquid crystal display 66 are separated by a light transmitting means or tubular light pipe 68, which has a right angle bend. Light source 64 is preferably a high intensity lamp, such as, for example, 12 volt halogen lamp, which dissipates about 75 watts of heat at its maximum brightness. Liquid crystal display 66 comprises a matrix of transmissive segments that selectively transmit light to synthesize a display image.

Light pipe 68 enables the placement of light source 64 at a location where the heat generated by the light source can be dissipated outside of the passenger compartment of the vehicle. Light pipe 68 is preferably constructed of aluminum tubing that is designed to efficiently transfer light emitted from light source 64 to liquid crystal display 66. The inner surface of light pipe 68 is preferably polished, nickel plated, or extruded such that the surface finish is smooth and shiny, thereby maximizing the light transmission. The use of aluminum promotes the efficient dissipation of heat generated by light source 64.

Heating of liquid crystal display 66 by lamp 64 is further minimized by the use of a cold mirror 70, which is positioned at the right angle bend in light pipe 68. In this configuration, cold mirror 70 functions as a folding mirror between light source 64 and liquid crystal display 66. Cold mirror 70 reflects visible light but transmits infrared light, thereby minimizing the heating of liquid crystal display 66. It will be appreciated that cold mirror 70 could be eliminated if light pipe 68 is of sufficient length to dissipate the heat generated by light source 64.

Liquid crystal display 66 is of the transmissive type and is back-illuminated by the high intensity light source 64. The intensity of light emitted by light source 64 can be changed by manually adjusting a brightness control potentiometer 72 or can be set automatically to maintain a fixed display contrast ratio (i.e., the ratio between the display brightness and the outside world brightness) independent of ambient or background brightness. Maintaining a fixed display contrast ratio is accomplished by an ambient light sensor diode 76 whose output current changes as a function of changes in ambient light intensity. Auto-brightness circuit 78 senses a change in the current flowing through sensor diode 76 and delivers an output signal to a lamp power supply 80 whose output voltage changes in response to the magnitude of the output signal of auto-brightness circuit 78. The intensity of light source 64 changes in response to the output voltage of power supply 80 to maintain a fixed display contrast ratio.

The transmissivity of the segments of liquid crystal display 66 is controlled by a processor circuit 82 that provides appropriate output signals whose voltages represent display information indicative of the status of a set of input signals. The input signals are applied to an interface circuit 86, and each one of them is read once every 60 milliseconds by processor 82. The input signals are characterized by one of three types of formats, and interface circuit 86 conditions the input signals for delivery to processor 82. The format of the input signals indicates whether they are frequency dependent, or of the analog or digital types. The vehicle speed and tachometer readings would be examples of frequency dependent input signals; the fuel and oil levels, engine temperature, or battery condition would be examples of analog signals; and the status of seatbelts, doors, brake, lights, high beams, and turn signals would be examples of digital signals. The output signals of processor 82 are applied to a segment driver circuit 88, which provides an output current of sufficient magnitude to drive the individual segments of liquid crystal display 66.

The projection and aberration correction optical assembly 20 projects the image information forward of the vehicle and consists of multiple lens elements fabricated from either plastic and/or glass materials. Optical assembly 20 also compensates for spherical aberrations and optical aberrations resulting from the complex windshield curvature. The design of optical assembly 20 includes a characterization of the effect of the aspheric shape of the windshield on the image information emanating from liquid crystal display 66 and the geometry dictated by the placement of the system in the vehicle. A suitable optical assembly 20 can be designed in accordance with conventional techniques by those having ordinary skill in the art. It will be appreciated that windshield curvature aberration correction would be unnecessary in vehicles, such as certain trucks, that have flat windshields.

While the present invention has been described in relation to a preferred embodiments, it is to be understood that various alternatives, substitution of equivalents, or other changes can be made without departing from the underlying principles of the invention. For example, an image source other than a liquid crystal display device could be used in implementing the invention. The scope of the invention should be determined, therefore, only with reference to the following claims.

We claim:

1. A windshield display system, comprising:
   an optically transparent windshield ply having an inner surface;
   exposed photosensitive material mounted adjacent to the inner surface of the optically transparent windshield ply, the photosensitive material having wavelength selective properties; and
   an optically transparent interlayer positioned to cover the photosensitive material that is mounted adjacent to the inner surface of the optically transparent windshield ply, the optically transparent windshield ply and the photosensitive material and the optically transparent interlayer being bonded together to form a unitary article.

2. The system of claim 1 further comprising a second optically transparent windshield ply wherein the first-mentioned windshield ply and the second windshield ply are arranged with the optically transparent interlayer and the photosensitive material positioned therebetween, both windshield plies and the photosensitive material and the optically transparent interlayer being bonded together to form a unitary article.

3. the system of claim 1 further comprising a primer layer of transparent material applied to the inner surface of the optically transparent windshield ply between the photosensitive material and the optically transparent windshield ply.

4. A windshield display system, comprising:
   first and second optically transparent windshield plies, the first and second windshield plies having opposed inner surfaces;
   exposed photosensitive material positioned between the inner surfaces of the first and second windshield plies, the photosensitive material having wavelength selective properties; and
   an interlayer of optically transparent material covering the photosensitive material and positioned between the inner surfaces of the first and second windshield plies.

5. A method of forming a windshield with an internal holographic combiner, comprising the steps of:
   positioning wavelength selective material adjacent to one surface of an optically transparent ply;
   covering, under pressure, the wavelength selective material with an optically transparent interlayer to form a windshield assembly comprising the optically transparent ply, the wavelength selective material, and the optically transparent interlayer;
   heating the windshield assembly to an intermediate temperature level within a range of about 40° C. to 80° C. within 3 to 7 minutes;
   holding the temperature of the windshield assembly at the intermediate level for about 10 to 20 minutes;
   heating the windshield assembly from the intermediate temperature level to a maximum temperature level within a range of about 100° C. to 150° C. within about 5 to 15 minutes;
   holding the temperature of the windshield assembly at the maximum temperature level for about 70 to 110 minutes; and
   cooling the windshield assembly to room temperature within about 5 to 15 minutes.

6. The method of claim 5 further comprising, prior to the step of positioning the wavelength selective material, a step of storing the wavelength selective material and the optically transparent interlayer in an environment having a relative humidity of less than about 30% and a temperature between 20° and 30°.

7. An optical display system for installation in a vehicle having a windshield formed of two optically transparent plies having opposed inner surfaces and bonded together to form a unitary structure, comprising:
   image source means for providing light image information;
   optical element means for displaying the image information to an observer, the optical element means comprising a combiner that includes wavelength selective material positioned between the inner surfaces of the plies and a first interlayer of optically transparent material covering the wavelength selective material and positioned between the inner surfaces of the first and second plies, the wavelength selective material being manufactured to reflect the light image information; and image projecting and aberration correcting means for directing the image information toward the optical element means and correcting for optical aberrations in the image information, thereby to display the image information to the observer.

8. The display system of claim 7 in which the image source means comprises a liquid crystal display and a light source for illuminating the liquid crystal display.

9. The display system of claim 8, further comprising light transfer means for transmitting light emitted by the light source to the liquid crystal display.

10. The display system of claim 9 in which the light transfer means comprises a tubular light pipe whose inner surface has reflection properties that promote light transmission.

11. The display system of claim 10 in which the light transfer means comprises a tubular light pipe having heat conduction properties that dissipate heat produced by the light source.

12. The display system of claim 7 in which the wavelength selective material is adaptable to conform to the contour of the plies.

13. The display system of claim 12 in which the wavelength selective material comprises a hologram.

14. A method of forming a windshield with an internal holographic combiner, comprising the steps of:
 positioning wavelength selective material adjacent to one surface of an optically transparent ply;
 covering the wavelength selective material with an optically transparent interlayer to form a windshield assembly comprising the optically transparent ply, the wavelength selective material, and the optically transparent interlayer;
 heating the windshield assembly from a first temperature to an intermediate temperature that is higher than the first temperature;
 holding the temperature of the windshield assembly at the intermediate temperature;
 heating the windshield assembly from the intermediate temperature to a maximum temperature that is higher than the intermediate temperature;
 holding the temperature of the windshield assembly at the maximum temperature; and
 cooling the windshield assembly to room temperature.

* * * * *